United States Patent [19]

Desplanches et al.

[11] 4,037,027
[45] July 19, 1977

[54] SODIUM-SULPHUR ELECTRIC CELL AND METHOD OF FORMING SAME

[75] Inventors: Gérard Desplanches, Villejust; Yvon Lazennec, St. Michel sur Orge; Alain Wicker, Limours, all of France

[73] Assignee: Compagnie Generale d'Electricite, Paris, France

[21] Appl. No.: 738,981

[22] Filed: Nov. 4, 1976

[30] Foreign Application Priority Data

Nov. 28, 1975 France .................................. 75.36558

[51] Int. Cl.² .................... H01M 10/36; H01M 10/38
[52] U.S. Cl. .................................... 429/104; 429/218; 429/191
[58] Field of Search ................... 429/104, 101, 30, 31, 429/191, 193, 218, 103, 105; 29/623.1

[56] References Cited

U.S. PATENT DOCUMENTS

| | | | |
|---|---|---|---|
| 3,468,709 | 9/1969 | Kummer | 429/104 |
| 3,946,751 | 3/1976 | Breiter et al. | 429/166 |
| 3,980,496 | 9/1976 | Ludwig et al. | 429/103 |

*Primary Examiner*—Anthony Skapars
*Attorney, Agent, or Firm*—Sughrue, Rothwell, Mion, Zinn and Macpeak

[57] ABSTRACT

The invention relates to a sodium-sulphur type electric cell. The cell includes a cathode tank containing sulphur and an anode tank containing sodium, fixed to an alumina plate, as well as an electrolyte tube immersed in the sulphur, such fixing being effected by disposing an aluminium seal between the tank and the plate and compressing at a temperature close to but less than the melting point of aluminium, at least the cathode tank being advantageously made of chrome-plated steel. The invention is implemented in electric cells for electric propulsion.

17 Claims, 3 Drawing Figures

SODIUM-SULPHUR ELECTRIC CELL AND METHOD OF FORMING SAME

FIELD OF THE INVENTION

The invention relates to sodium-sulphur type electric cells and in particular to a method of embodying such electric cells.

BACKGROUND OF THE INVENTION

It is known that in electric cells of this type, the anode reagent consists of an alkaline metal, generally sodium, which must be liquid at operation temperature. The cathode reagent generally consists of sulphur and sodium salts of this substance, but may alternatively be phosphorus, selenium and alkaline salts of these substances. In the case where the reagent materials are sulphur and sodium, the electrochemical reaction leads to a reversible formation of polysulphides whose sodium content increases during the discharge. As for the electrolyte, which separates the cathode and anode reagents, it must be solid at operation temperature and permeable to alkaline ions which form in the anode compartment but impermeable to electrons. It generally consists of beta sodium alumina, i.e. a compound having about 5 to 9 alumina molecules for one sodium oxide molecule. It is generally in the shape of a tube closed at its bottom, containing the anode reagent and immersed in the cathode reagent, the latter reagent being contained in a metal cathode tank. The electrolyte tube is held by a support connected in a fluid-tight manner to this cathode tank and also to an anode reagent tank.

Generally, this support is in the form of a plate or disk made of alpha alumina. This disk has a central bore in which the beta sodium alumina tube is fixed by means of a glass part, such as described by the Applicant in his French patent application No. 7337066 of Oct. 17, 1973.

Now, inasmuch as concerns the connections between the electrolyte tube support disk and the cathode tank and anode tank the latter is formed, as described in the above-referenced patent application, by ceramics-metal brazing.

However, although the connections formed in this way have good mechanical characteristics as well as high chemical resistance to the aggressivity of the reagents, the applicant has further improved such connections, with a view to providing them with better mechanical and thermal qualities.

Prefered embodiments of the invention provide a method for producing a sodium-sulphur type electric cell in which the connection between the various components is further improved and has, moreover, excellent resistance to the aggressivity of the reagents.

The invention therefore relates to a method of producing a sodium-sulphur type electric cell having the following construction.

A cathode tank contains a cathode reagent which is liquid at operation temperature and is selected from the group formd by sulphur, phosphorus, selenium and alkaline salts of these substances.

At least one solid electrolyte tube is closed at its bottom end, contains an anode reagent which is liquid at operation temperature and consists of an alkaline metal and is disposed in said cathode tank so as to be immersed in said cathode reagent with the walls of this tube being made of beta sodium alumina.

A support made of an insulating ceramics substance holds said electrolyte tube in said cathode tank with the connection between this support and this tube being provided by a glass part;

An anode tank containing a store of said anode reagent and is disposed above said cathode tank, so that said lectrolyte tube opens at its top part in this anode tank and said plate separates the open ends of said anode tank and of said cathode tank.

The method of manufacturing said cell involves the following steps.

First the connection is formed between said electrolyte tube and said support made of an insulating ceramics substance.

Successively, said tanks are disposed on either side of said support made of an insulating ceramics substance by means of flanges provided at their open end and substantially concentric with said electrolyte tube, and an O ring is inserted between the end of the walls of the tanks and said ceramics support.

The assembly is then heated to a temperature close to but lower than the melting point of the material constituting said O ring while maintaining pressure on said flanges.

The assembly is then cooled down to ambient temperature. The invention is further charaterized by at least one bushing being previously disposed in contact with at least the internal bottom part of the wall of each of said tanks with said bushing resting on said insulating ceramics support.

An embodiment of the invention is described by way of example, with reference to the accompanying drawings.

DESCRIPTION OF THE PREFERRED EMBODIMENT

Figure 1:
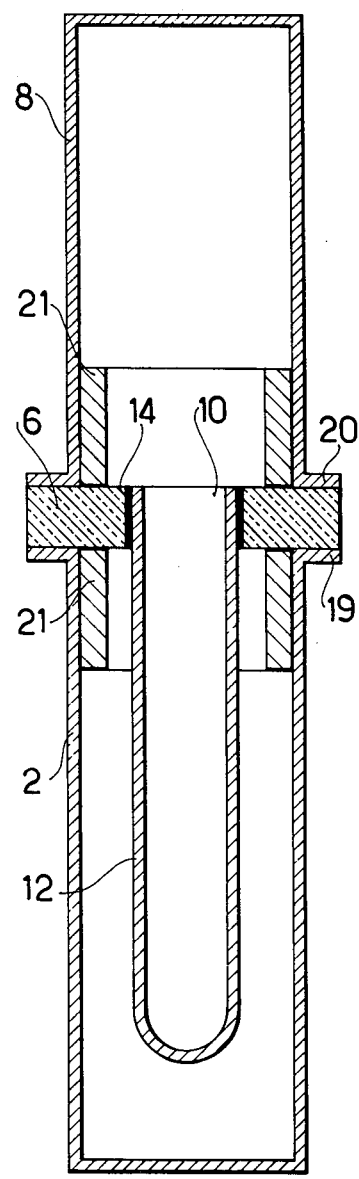
FIG. 1 is a sectional side view of an electric cell according to the invention.

The electric cell is in the form of a cylinder of revolution and FIG. 1 is a cross-section view thereof in an axial plane.

The electric cell shown has a cylindrical cathode tank 2 with a diameter of 20 mm and a height of 50 mm for example.

This tank is lined with graphite felt (not shown) impregnated with sulphur and acting as a current collector. The wall of the tank 2 is fixed at its top part to the bottom face of an alpha alumina plate 6 which is horizontal and circular, having a thickness of 5 mm and a diameter of 25 mm, as will be described hereinbelow.

A cylindrical anode tank 8, having substantially the same diameter as the the cathode tank 2 and a height of 40 mm, is fixed in the same way by its bottom part to the top face of the plate 6.

It contains a supply of anode reagent not shown, namely liquid sodium.

The plate 6 has a cylindrical bore 10 with a vertical axis, 10.5 mm in diameter, at its centre. The open top end of an electrolyte tube 12 closed at its bottom end, made of beta sodium alumina and containing the anode reagent is inserted in this bore 10.

The top edge of the tube 12 is in the plane of the top face of the plate 6. Its external diameter is 10 mm and its internal diameter is 8 mm.

A glass connection part 14 is inserted between the outside wall of the top of the tube 12 and the wall of the bore 10 formed in the plate 6 so as to make the joint fluid-tight. The glass compounds used are advantageously borosilicate compounds containing no potassium and in particular having the following composition by weight:

Si $O_2$ : 70.36%
$Al_2O_3$ : 1.88%
$B_2O_3$ : 19.56%
$Na_2O$ : 8.20%

This glass is manufactured by the French company SOVIREL.

The wall of the tank 2 is fixed to the plate 6 by means of a flange 19 and likewise the wall of the tank 8 is fixed to said plate 6 by means of a flange 20, as shown in FIG. 1.

The cathode tank 2 and the anode tank 8 are fixed or connected to the plate 6 by the method of the invention as follows after having, in all cases, connected the tube 12 to the plate 6 by means of glass part 14.

Figure 2:
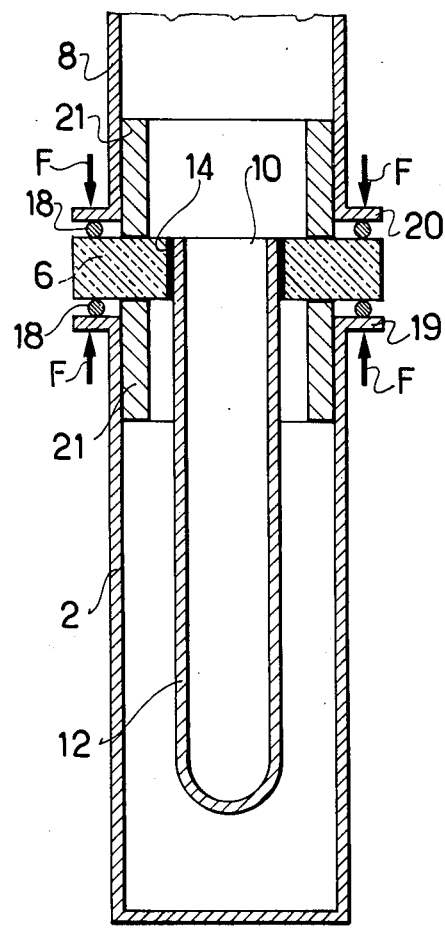
FIG. 2 illustrates a phase of the construction of said electric cell according to FIG. 1.

As shown in FIG. 2, the open ends of said tanks 2 and 8 are disposed on the plate 6 concentrically in relation to the tube 12, with aluminium O rings 18, however, disposed between the flanges 19 and 20 and said plate 6.

Figure 3:
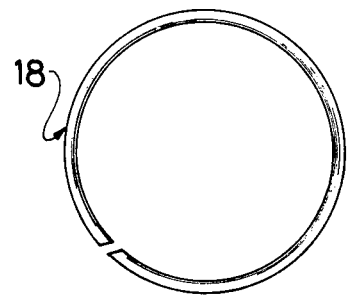
FIG. 3 is a plan view of the O-ring employed in FIG. 2.

Such O rings shown in FIG. 3 are split and have overlapping bevelled ends. They are made of very pure aluminium which hence contains less than 1000 parts per million of impurities. Also, a bushing 21 made of a material such as stainless steel, or ceramics substance, e.g. alumina, which withstands the aggressivity of reagents is disposed in contact with the internal walls of each of the tanks 2 and 8 and with the plate 6.

The assembly is then heated to a temperature lying between 550° and 630° for a period of 5 minutes to 1 hour, while applying a pressure on the flanges 19 and 20 shown by the arrows F, this pressure lying between 50 and 600 Bar, when the vacuum is $10^{-3}$ to $10^{-5}$ Torr, in a neutral atmosphere of argon or nitrogen or in a reducing atmosphere of argon and hydrogen or of cracked ammonia at atmospheric pressure in this case.

The assembly is allowed to cool down to ambient temperature. The tanks are thus fixed to the plate 6 as shown in FIG. 1.

It will be observed that the use of bushings 21 prevents the creep of the walls of the tanks 2 and 8 inwards and consequently any deformation of these walls.

Inasmuch as concerns the materials of which the tanks 2 and 8 are made, these are selected from among stainless steel, molybdenum, chromium, aluminium, ternary nickel-chromium-molybdenum alloys or an aluminium-magnesium alloy.

Further, at least the cathode tank 2 is made of chrome-plated steel.

Such a material has unlimited resistance to corrosion by molten reagents and in particular sulphur, such resistance resulting from the forming on the internal wall of the tank 2 of a thin film of chromium sulphide acting as an anti-corrosion barrier.

Of course, the anode tank 8 can also be made of chrome-plated steel like the cathode tank 2.

Preferred materials and other details are given hereinbelow.

The tanks 2 and 8 are made of chrome plated steel; this chrome-plated steel is XC10 steel according to Afnor standards, coated with a layer of chromium of 10 to 150 microns by any suitable technique. The wedge-shaped O rings 18 are made of 99.995% pure aluminium. The bushings 21 are made of alumina.

The assembly is heated to a temperature of 580° C maintained for 30 minutes at a pressure of 200 Bar with a vacuum of $10^{-4}$ Torr in a reducing atmosphere of argon with 10% hydrogen.

Whatever the embodiment used, in all cases connections are obtained between tanks 2 and 8 and plate 6 which are fluid-tight and have high mechanical strength and thermal resistance and have, like the tanks, particularly high resistance to corrosion by molten reagents and in particular by sulphur.

Advantageous applications are found for the invention in the field of storage cells for electric vehicles.

Of course, the invention is not limited to the embodiment described and illustrated, but on the contrary, it covers all the embodiments thereof.

What we claim is:

1. A method of producing a sodium-sulphur type electric cell, said cell comprising:

a cathode tank for containing a cathode reagent which is liquid at operation temperature and is a material selected from the group consisting of sulphur, phosphorus, selenium and alkaline salts of these substances;

at least one solid electrolyte tube closed at its bottom end, for containing an anode reagent which is liquid at operation temperature, said tube consisting of an alkaline metal and being disposed in said cathode tank so as to be immersed in said cathode reagent, the walls of said tube being made of beta sodium alumina;

a support of an insulating ceramics substance for holding said electrolyte tube in said cathode tank, a glass part connecting said support to said tube;

an anode tank for containing a store of said anode reagent and being disposed above said cathode tank, so that said electrolyte tube opens at its top into said anode tank, said support separating the open ends of said anode tank and of said cathode tank;

said method comprising:

first, forming the connection between said electrolyte tube and said support of an insulating ceramics substance;

and successively disposing said tanks on either side of said support with flanges provided at their open ends and with said tanks substantially concentric with said electrolyte tube;

inserting an O ring respectively between the flanges of the tanks and said ceramics support;

heating the assembly to a temperature close to but lower than the melting point of the material constituting said O rings while maintaining compressive pressure on said flanges;

cooling the assembly down to ambient temperature; and disposing at least one bushing previously in contact with at least the bottom part of the wall of each of said tanks with said bushings bearing on respective faces of said insulating ceramics support prior to heating said assembly.

2. A method according to claim 1, wherein the material constituting said O ring is aluminium containing at the most 1000 parts per million impurities.

3. A method according to claim 1, wherein said O rings are split and have wedge-shaped ends.

4. A method according to claim, 1 wherein said temperature lies between 550° and 630° C, and said pressure lies between 50 and 600 Bar and is maintained for a period of 5 minutes to 1 hour.

5. A method according to claim 4, wherein said assembly is maintained in a vacuum lying between $10^{-3}$ and $10^{-5}$ Torr or in a neutral or reducing atmosphere at atmospheric pressure.

6. A method according to claim 1, wherein said bushings are made of a material which withstands the aggressivity of said reagents, and is selected from one material of the group consisting of stainless steel and a ceramics substance.

7. A method according to claims 1, wherein the material constituting said anode tank and said cathode tank is selected from the group consisting of stainless steel, molybdenum, chromium, aluminum, ternary nickel-chromium-molybdenum alloys and aluminium and magnesium alloys.

8. A method according to claim 1 wherein said cathode tank is made of chromium steel, said anode tank being made of a material selected from the group consisting of stainless steel, molybdenum, chromium, aluminum, ternary nickel-chormium-molybdenum alloys and aluminum and magnesium alloys.

9. A method according to claim 1 wherein said anode tank as well as said cathode tank are both made of chrome-plated steel.

10. A method according to claim 1, wherein said insulating ceramics support is made of alpha alumina.

11. An electric cell of the sodium-sulphur type, said cell comprising:
a cathode tank for containing a cathode reagent which is liquid at operation temperature and is a material selected from the group consisting of sulphur, phosphorus, selenium and alkaline salts of these substances;
at least one solid electrolyte tube closed at its bottom end for containing an anode reagent which is liquid at operation temperature, said tube consisting of an alkaline metal and being disposed in said cathode tank so as to be immersed in said cathode reagent, the walls of said tube being made of beta sodium alumina;
a support of an insulating ceramics substance for holding said electrolyte tube in said cathode tank,
a glass part connecting said support to said tube,
an anode tank for containing a store of said anode reagent and being disposed above said cathode tank so that said electrolyte tube opens at its top into said anode tank, said support separating the open ends of said anode tank and said cathode tank,
said tanks being initially disposed on either side of said support and including flanges provided at their open ends substantially concentric with said electrolyte tube with an O ring inserted respectively between the flanges of the tanks and said ceramic support, and said tanks being joined to said support by heating the assembly to a temperature close to but lower than the melting point of the material constituting said O rings while maintaining compressive pressure on said flanges and cooling said assembly, and
at least one bushing disposed in contact with said at least the internal bottom part of the wall of each of said tanks with said bushings bearing on respective faces of said insulating ceramic support prior to heating said assembly.

12. The electric cell as claimed in claim 11, wherein said material constituting said O ring comprises aluminum containing at the most 1,000 parts per 1,000,000 impurities.

13. The electric cell as claimed in claim 11, wherein said O rings are split and have wedge-shaped ends.

14. The electric cell as claimed in claim 11, wherein said bushings are made of a material which withstands the agressivity of said reagents and is selected from one material of the group consisting of stainless steel and ceramic substance.

15. The electric cell as claimed in claim 11, wherein the material constituting said anode tank and said cathode tank is selected from the group consisting of stainless steel, molybdenum, chromium, aluminum, ternary nickel-chromium-molybdenum alloys and aluminum and magnesium alloys.

16. The electric cell as claimed in claim 11, wherein said anode tank and said cathode tank are both made of chrome-plated steel.

17. The electric cell as claimed in claim 11, wherein said insulating ceramic support is made of alpha alumina.

* * * * *

UNITED STATES PATENT AND TRADEMARK OFFICE
CERTIFICATE OF CORRECTION

PATENT NO. : 4,037,027
DATED : July 19, 1977
INVENTOR(S) : Gerard Desplanches et al It is certified that error appears in the above-identified patent and that said Letters Patent are hereby corrected as shown below:

IN CLAIM 1, line 28 of column 4, (line 10 of claim 1):

after "at operation temperature" delete
    [, said tube consisting] and insert
    ----- and which consists ---- line 29 of column 4, (line 11 of claim 1):

after "alkaline metal and" insert
    ----- said tube ----

Signed and Sealed this

*Twenty-second* Day of *November 1977*

[SEAL]

*Attest:*

RUTH C. MASON
*Attesting Officer*

LUTRELLE F. PARKER
*Acting Commissioner of Patents and Trademarks*